United States Patent [19]
König et al.

[11] Patent Number: 6,030,317
[45] Date of Patent: Feb. 29, 2000

[54] HYDRAULIC CONTROL FOR OPERATING AN AUTOMATIC GEARBOX, ESPECIALLY A CONTINUOSLY VARIABLE TRANSMISSION

[75] Inventors: Hubert König, Tettnang; Hans Peter Stoll, Oberteuringen, both of Germany

[73] Assignee: ZF Friedrichshafen AG, Friedrichshafen, Germany

[21] Appl. No.: 09/125,909

[22] PCT Filed: Mar. 21, 1997

[86] PCT No.: PCT/EP97/01430

§ 371 Date: Aug. 27, 1998

§ 102(e) Date: Aug. 27, 1998

[87] PCT Pub. No.: WO97/37158

PCT Pub. Date: Oct. 9, 1997

[30] Foreign Application Priority Data

Mar. 30, 1996 [DE] Germany .......................... 196 12 864

[51] Int. Cl.[7] .................................................. F16H 61/06
[52] U.S. Cl. ................ 477/143; 192/87.18; 91/529; 91/530; 91/523; 477/117
[58] Field of Search .................... 192/87.14, 87.18, 192/87.13, 87.19; 477/143, 115, 116, 117, 130, 131, 145; 91/525, 528, 529, 530, 523; 137/596.16, 625.64, 119.08

[56] References Cited

U.S. PATENT DOCUMENTS

| | | | |
|---|---|---|---|
| 3,780,762 | 12/1973 | Matthews et al. | 192/87.19 X |
| 4,492,251 | 1/1985 | Blake | 192/87.14 X |
| 4,619,187 | 10/1986 | Blake et al. | 91/523 |
| 4,638,720 | 1/1987 | McKee et al. | 91/530 X |
| 4,702,148 | 10/1987 | Kussel et al. | 91/529 X |
| 4,729,408 | 3/1988 | Coutant | 137/596.16 X |
| 4,795,017 | 1/1989 | Muncke | 192/87.19 X |
| 4,817,770 | 4/1989 | Coutant | 192/87.13 X |
| 4,844,202 | 7/1989 | Maresko | 184/6.12 |
| 4,936,430 | 6/1990 | Shikata | 192/3.58 |

FOREIGN PATENT DOCUMENTS

| | | |
|---|---|---|
| 0 309 070 A2 | 3/1989 | European Pat. Off. . |
| 2 343 170 | 9/1977 | France . |
| 34 47 938 C2 | 11/1985 | Germany . |
| 37 25 578 A1 | 2/1988 | Germany . |
| 38 33 622 A1 | 4/1990 | Germany . |
| 44 14 804 A1 | 11/1995 | Germany . |
| 57-184730 | 11/1982 | Japan ................ 192/87.14 |
| 1-216152 | 8/1989 | Japan ................ 192/87.14 |
| WO 87/00596 | 1/1987 | WIPO . |

*Primary Examiner*—Charles A Marmor
*Assistant Examiner*—Ankur Parekh
*Attorney, Agent, or Firm*—Davis and Bujold

[57] ABSTRACT

A hydraulic control for operating an automatic transmission, especially a continuously variable transmission, has at least one first and one second switching component (1, 2) for forward or reverse drive from a neutral position (N) to a drive (D) or reverse (R) position and vice versa. The switching components (1, 2) can be actuated by pressure via pressure lines (24, 25) by a selector slide (15) and by a switching device (26) between the selector slide (15) and the switching components (1, 2) which has a switching valve (27, 28) and a damper, switching and vent valve (29, 30) for a switching component (1, 2). The switching device (26) has a safety and vent device designed in a manner such that when one of the switching components (1, 2) is actuated, the other switching component(s) is/are automatically disengaged.

11 Claims, 1 Drawing Sheet

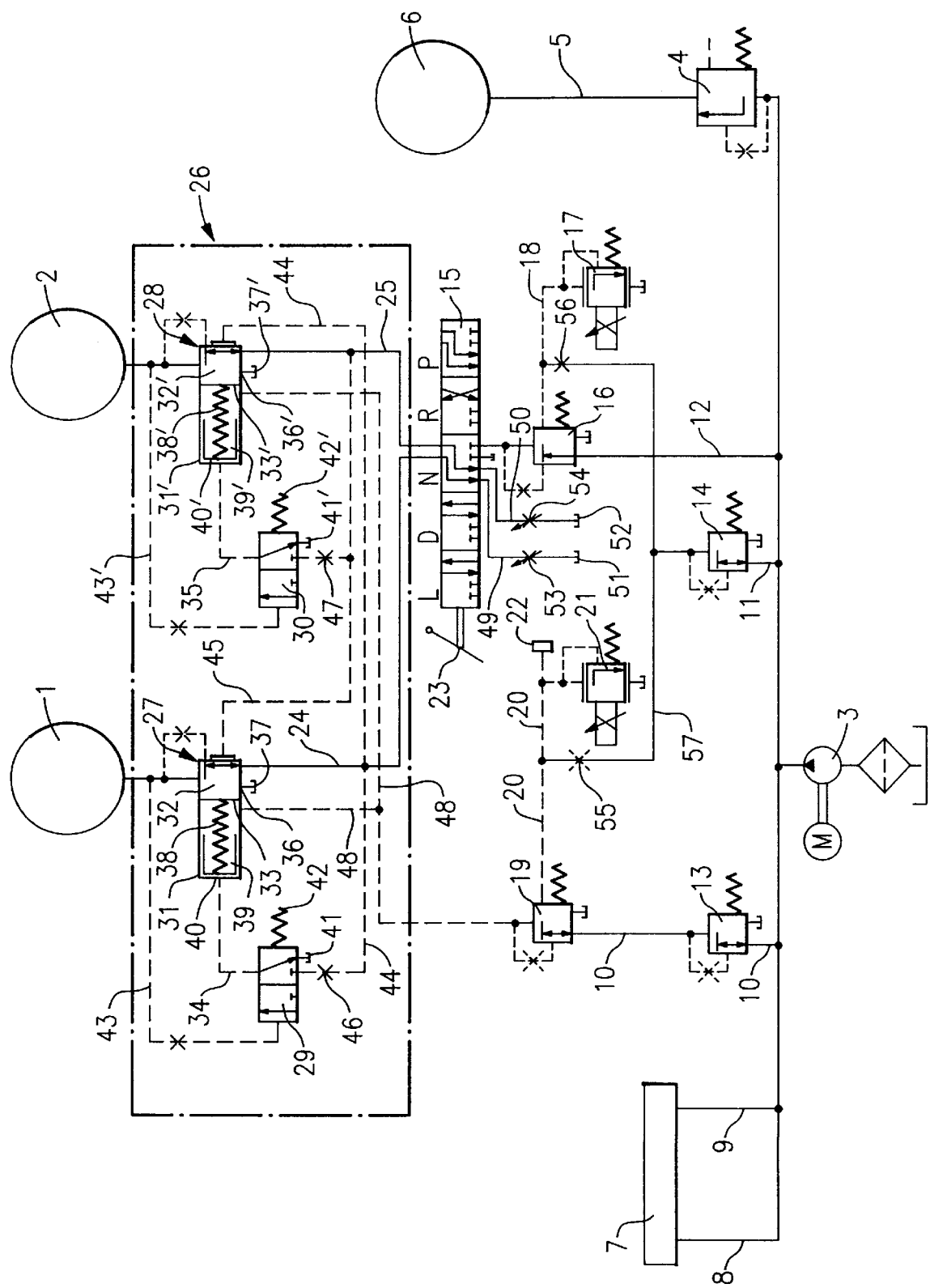

HYDRAULIC CONTROL FOR OPERATING AN AUTOMATIC GEARBOX, ESPECIALLY A CONTINUOSLY VARIABLE TRANSMISSION

The invention relates to a hydraulic control for operating an automatic transmission including a CVT, having at least one first and one second switching component for forward or reverse drive from a neutral position to a forward drive position or a reverse drive position and vice versa.

BACKGROUND OF THE INVENTION

As generally known from the practice, in automatic transmissions with hydraulically actuated switching components, which usually have a switching piston installed in a piston space on a disc set to carry out a gearshift, the switching component is first filled with oil before the switching piston is placed on the disc set. If the switching component is disengaged, the pressurized medium is removed from the switching component and the disc set is again relaxed. The filling and installation of a switching component has a rapid filling phase in which the switching component that is almost full or running partly empty is filled with oil, there follows a filling equalizing phase during which a switching piston is placed on the disc set. At the end of the filling equalizing phase follows a pressure increasing phase which can be reproduced as pressure ramp increasing in the course of time. During this pressure increasing phase or pressure ramp the discs are adequately pressed together and can transmit or receive a torque.

It also is generally known that in a first range up to the beginning of the pressure ramp a turbine belonging to a hydraulic start component of the transmission rotates at the idling speed of an engine connected with the transmission. When the pressure ramp has been climbed, the speed of the turbine goes back to zero and a torque is passed, for example, to the wheels of a motor vehicle wherein a jerky process generally occurs which, as a rule, is felt as disturbing.

After the end of the pressure ramp, the pressure can be further raised, to increase torque transmission, by the switching components. The rise in pressure is effected according to what is needed.

On the other hand, when the switching component is opened, for example, the turbine begins to rotate until it reaches the engine idle speed. As a rule, the turbine can then take up in a manner such that this, in turn, is noticed by the driver as light jolt.

There have become known from testing that the gearshift operation can be made more comfortable by using switching times which are as brief as possible.

However, this raises questions, relative to safety, since in a change that is too quick, under certain circumstances, two switching components are simultaneously loaded with pressure and work against each other, causing a lock up of the transmission. This can bring about a situation critical to safety in addition to the operating comfort being greatly reduced.

SUMMARY OF THE INVENTION

Therefore, the problem to be solved by the invention is to provide a control for operating an automatic transmission from a neutral position to a forward drive position or a reverse drive position and vice versa, the same as reversal shifts forward drive position—reverse drive position and vice versa with which a more comfortable, almost jolt-free, quicker and safer gearshift is obtained.

The control according to the invention makes it possible that the change between the neutral position and the forward drive position or reverse drive position and back, the reversal shifts to forward drive position—reverse drive position and vice versa be so comfortable that as a rule the occupants of a motor vehicle will not notice the gearshift either by a switching jolt or by a noise.

In addition, it is possible with the control, according to the invention, to keep the starting point of a pressure ramp constant during pressure loading by the damper, switching and vent valve.

The control, according to the invention, offers the added advantage that it is very quickly possible to make shifts between forward drive position and reverse drive position wherein the switching components are reciprocally blocked in a manner such that, upon actuation of a switching component, other switching components are automatically disengaged.

A quick vent of the unactuated switching components can advantageously prevent the occurrence of an operating state in which two switching components are simultaneously actuated, that is, there cannot occur any transmission stress or head-on blockage of the switching components which would cause a torque impact.

The control, according to the invention, contributes considerably to an increase of the operating safety of a vehicle.

The quick vent of the switching components upon reversals is ensured by a very advantageous quick vent of the damper space of the switching valves, via the damper, switching and vent valve.

With the control, according to the invention, it is in addition possible advantageously to regulate, according to the torque to be transmitted, the pressure on a switching component even in operating state. The control, according to the invention, is further advantageous in that tolerances in the pressure loading of the switching components can be compensated.

Other advantages and advantageous developments of the invention result from the sub-claims and the description that follows of an embodiment with reference to the drawing.

BRIEF DESCRIPTION OF THE DRAWING(S)

The drawing shows a basic representation of a hydraulic control, according to the invention, for an automatic transmission having two switching components for forward and reverse drive. A CVT transmission (continuously variable transmission) is also possible here.

DESCRIPTION OF THE PREFERRED EMBODIMENTS

Referring to the drawing, it shows a hydraulic control of an automatic transmission in a motor vehicle, the individual components of which are, to a great extent, of known design for which reason only the essential features will be discussed in detail.

To operate a switching component 1 and another switching component 2 which are symbolically indicated in the drawing, system pressure is fed by a pump 3 to a hydraulic system. The system pressure is first set by a first pressure-limiting valve 4 which is controlled by an electronically controlled pressure regulator. The pressure-limiting valve 4 is connected by a pressure line 5 with a hydraulically starting component 6, only symbolically indicated, the oil supply of which is thereby ensured. Together with the hydraulic starting component 6, consumers 7, indicated only symbolically, are supplied with system pressure, via pressure lines 8 and 9.

The system pressure to operate the switching components 1 and 2 of the hydraulic system is fed, via other pressure lines 10, 11, 12, there being situated in each line 10 and 11 a pressure-reducing valve 13, 14 which reduces the system pressure to a constantly remaining output value which is always lower than a minimum pressure adjustable by the pressure-limiting valve 4. In the instant embodiment, the output pressures of the pressure-reducing valves 13 and 14 are equal but in another embodiment they can also be different.

In the pressure line 12, which leads to a selector slide 15, is situated a clutch pressure valve 16 which regulates the pressure level on the switching components 1 and 2. The clutch pressure valve 16 regulates the pressure loading of the switching components 1 and 2 in accordance with the torque. Thus, it is possible to preset a torque-dependent pressure, via the clutch pressure valve 16, in the operation with a closed switching component 1, 2. The clutch pressure valve 16 is controlled by an electromagnetically adjustable pressure regulator 17 with which the clutch pressure valve 16 is connected by a pressure line 18. The pressure regulator 17 is a proportional valve which is actuated by a current supplement in a manner such that for each change of current, a change of the output pressure of the pressure regulator 17 also linearly occurs.

During a pressure buildup in one of the switching components 1, 2 which is along an adjustable pressure ramp having a ramp gradient and a ramp operating time, the clutch pressure valve 16 remains unchanged. This applies as long as no change of torque occurs on the engine during the gearshift operation.

During travel, the clutch pressure valve 16 takes over, in addition, the task of a reverse drive lock, for which advantageously no other components are needed. To this end, the clutch pressure is disengaged when changing the forward drive above a specific velocity of the vehicle.

To regulate a load valve 19 on which is applied, via the pressure line 10, the output pressure of the pressure-reducing valve 13, the latter is connected by a pressure line 20 with a pressure regulator 21 having a constructional configuration identical to the pressure regulator 17 which is coordinated with the clutch pressure valve 16.

From the pressure line 20, which connects the pressure regulator 21 with the load valve 19, branches off another pressure line 22 for pressure supply of other functions, not shown, such as for maintaining a certain pressure level in other hydraulic circuits of the transmission. The connecting pressure line 20 between the load valve 19 and the pressure regulator 21 and the connecting line 18 between the clutch pressure valve 16 and the pressure regulator 17 are each connected, via a pressure line 57, with the pressure-reducing valve 14, the constant output pressure of which is fed, via feed-in nozzles 55, 56, to the pressure lines 18, 20.

Depending on the position of the selector slide 15, five switching positions can be selected, namely, the switching positions D, L for forward drive, a switching position R for reverse drive, a switching position N for neutral position and a switching position P for parking position. The selector slide 15 is manually actuatable by a selector lever 23. In the drawing the selector slide 15 is shown in neutral position N which hydraulically considered is equivalent to the parking position P, since in both switching positions N and P the switching components 1 and 2 are vented.

From the selector slide 15, a pressure line 24 leads to the switching component 1 and a pressure line 25 leading to the switching component 2, there being situated between the switching components 1 and 2 and the selector slide 15 a switching device 26 which has, for each one of the switching components 1 and 2, a respective switching valve 27 and 28 and a damper, switching and vent valve 29 and 30. The switching position of the switching components 1 and 2 is determined by the position of the selector slide 15, by the position of the switching valves 27, 28 and by the position of the clutch pressure valve 16.

In addition, the selector slide 15 performs an emergency function in case of failure of the transmission control when the valves 17, 19 are no longer electrically controllable, since the switching components 1 and 2 can be further actuated by the switching valves 27, 28, via a pressure ramp. The reciprocal interlocking is maintained here. In an emergency the pressure loading of the switching components 1, 2 with a maximum clutch pressure is provided by the pressure regulator 17 and the clutch pressure valve 16 interacting therewith.

The switching valve 27 coordinated with the switching component 1 is in the pressure line 24 and the switching valve 28 coordinated with the switching component 2 is in the pressure line 25 intercalated between the switching component 1 or 2 and the selector slide 15. The switching valves 27, 28 have in a respective valve housing 31, 31' a movable valve piston 33, 33', a damper piston 40, 40' and a compression spring 38, 38'. The damper pistons 40, 40' can be loaded here with a control pressure which, via a pressure line 34 or 35, reaches from the damper, switching and vent valve 29 to the switching valve 27 or 28.

The valve housing 31, 31' of the switching valves 27 and 28 have each a supply of pressurized medium via the lines 24, 25 and a tank connection 37, 37'.

In the valve housings 31, 31', between the valve pistons 33, 33' and the damper piston 40, 40', in a working space 39, 39', is situated axially movably supported a prestressable spring 38, 38'.

A switching valve 27 or 28 is pressure loaded directly, via the appertaining damper, switching and vent valve 29 and 30 and at a moment when the appertaining switching component 1 or 2 is almost entirely filled with pressurized medium. The reversal point of the damper, switching and vent valve 29 and 30 is therefore slightly below a charge pressure of the appertaining switching component 1 or 2. A pressure ramp on the switching component begins after reversal of the appertaining damper, switching and vent valve 29, 30, for example, when the pressure of the switching component is substantially 0.2 to 0.3 bar below a final filling value. Thereby the pressure buildup is constant for all factors affecting an operating state such as temperature and oil viscosity. When disengaging the switching component 1 or 2 concerned, the oil volume cropping out behind the damper piston 40, 40' is directly removed, via the appertaining damper, switching and vent valve 29 or 30 directly to a tank 41, 41' whereby a quick vent is ensured.

The damper, switching and vent valves 29, 30 are designed in the embodiment, according to the drawing, as 3/2 slide valves and each having a spring 42, 42' which determines the reversal value of the respective damper, switching and vent valve 29, 30 so as to counteract a pressure on the switching component 1, 2 which has been fed, via pressure lines 43, 43' to the damper, switching and vent valve 29 or 30. The reversal value of the valve 29 or 30 is thereby function of the filling pressure of the coordinated switching component. In the embodiment shown the springs 42, 42' have a different design and are adapted to the operating conditions. In another embodiment, similar springs obviously can be used.

To prevent that two switching components from being simultaneously actuated, the switching device 26 has a safety and vent device which ensures that upon actuation of one of the switching components 1 or 2 the other switching component is automatically disengaged. To this end, there branches off from the pressure line 24, between the selector slide 15 and the switching valve 27 of the first switching component 1, a control pressure line 44 which introduces a control pressure on an active surface of the valve piston 33' which is coordinated with the not selected switching component 2 whereby the valve piston 33' of the switching valve 28 is moved to the left far enough so that the tank outlet 37' of the switching valve 28 is opened. Thereby pressurized medium is directly removed to the tank 37' from the unactuated switching component 2. The pressure line 44, which branches off from the pressure line 24, is in addition connected with the damper, switching and vent valve 29, of the selected switching component 1 and via the component and the pressure line 34 feeds pressurized medium to the switching valve 27 in a manner such that the damper piston 40 of the switching valve 27, within a time determined by the feed-in nozzle 46, moves to the right and thereby continuously prestresses the compression spring 38. From the continuously increasing spring compression upon the left side of the valve piston 33 there is produced in the interplay with the reduced pressure of the switching component 1, which engages an active surface on the right side of the valve piston 33, the pressure ramp needed to operate the switching component. The switching component 2 is here automatically vented.

If the switching component 2 is selected and must be actuated, it is similarly loaded with pressure and the switching component 1 is locked.

The safety and vent device thus ensures a reciprocal locking since while loading with pressure one of the switching components 1 or 2, the switching valve of the unactuated switching component is loaded with pressure in opposite direction so that in a reversal a quick vent of the other switching component by force takes place.

The supply of control pressure, via the control pressure lines 44 and 45 to the respective damper, switching and vent valve 29 or 30 is throttled by a nozzle 46 and 47 which determines the definite operating time of the ramp.

In the working space 39, 39' of the spring 38, 38', the load pressure is fed, via a pressure line 48, by the load valve 19.

From a balance of the forces on the switching valves 27, 28 can be detected, for example, that the pressure of the switching component 2 is momentarily proportional to the load pressure of the loading valve 19 during the damper operating period. The pressure on the switching component 2 is likewise proportional to the spring tension of the spring 38' in the switching valve 28 belonging to the switching component 2. This means that in consequence of a change in the prestress of the spring 38' an increase of the pressure in the coordinated switching component 2 occurs, that is, a change of path on the spring constitutes a change of pressure or basic ramp. The spring prestress is increased, according to the volume flowing in, whereby the pressure increases on the switching component concerned.

The pressure originating from the loading valve 19 depends on an engine load and is altered by the pressure regulator 21. The loading valve 19 acts with its output pressure, via the pressure line 48, upon both switching valves 27, 28 or the valve piston 33, 33' thereof. Thereby the pressure ramps produced by said switching valves in the appertaining switching component 1 or 2, for example, can be changed in a manner such that the pressure ramp extends with equal gradient to a higher pressure level. In this manner, the switching components 1, 2 are supplied with pressurized medium according to the load.

The vent of the switching components 1, 2 on the switching valves 27, 28 takes place when reversing via the respective tank connection 37, 37' When switching back from forward position or reverse position after neutral or parking position, the corresponding switching components are vented via the selector slide 15 and the draining nozzles 53, 54 in the tank 51, 52.

The beginning of the pressure ramp is determined by the pressure fed to the switching valve 27 or 28 by the respective damper, switching and vent valve 29 or 30 via the pressure line 34 or 35. On the other hand, the load pressure of the loading valve 19 serves for a change of the pressure loading of the valve piston 33, 33' in the switching valves 27, 28, for example, when the load change occurs by gas supply during the gearshift.

By the load pressure of the loading valve 19, a comfortable gearshift course can be represented even when shifting from the neutral position N to the forward drive position D or L or to the reverse drive position R under an engine part load.

If the selector slide 15 is in neutral position N or parking position P, both switching components 1 and 2 are vented by removing the pressurized medium from the switching components via the selector slide 15 and pressure lines 49 and 50 to a pressurized-medium tank 51 or 52. Between the selector slide 15 and the pressurized-medium tank 51 or 52 is placed a draining nozzle 53 or 54 which adjusts the cross section of the through flow for the drain of the pressurized medium in accordance with the temperature of the transmission. Corresponding to the higher oil viscosity at low temperatures or low oil viscosity at high temperatures, the draining nozzles 53, 54 change their cross section in such a manner that at low temperatures large drain cross sections and at high temperatures small drain cross sections are adjusted. By the temperature-dependent adjusting function, which is obtained by any temperature-dependent setting or adjustment members (not shown), the discharge time of the switching components 1, 2 can be maintained constant over the transmission temperature range.

On the other hand, when shifting directly from forward drive to reverse drive, no delay of the pressure breakdown occurs in the switching components 1, 2 by the draining nozzles 53, 54, since this would cause a jolt which impairs the gearshift quality. The switching components 1, 2 are drained here via the tank connections 37, 37' on the switching valves 27 and 28.

We claim:

1. A hydraulic control in an automatic transmission having at least first and second switching components (1, 2) with which is effected a gearshift from a neutral position (N) to a forward drive position (D), reverse drive position (R), parking position (P) or other switching positions for forward and reverse drive and having a hydraulic system with pressure lines and with the following features:

a) said switching components (1, 2) are actuatable with pressure which is fed via pressure lines (24, 25) connected with a selector slide (15);

b) said switching device (26) has a switching valves (27, 28) contained in valve housings (31, 31'), for each switching component (1, 2), said valve housings (31, 31') of said switching valves (27, 28) being supplied with pressurized medium via a respective pressure line (24, 25) and having a tank connection (37, 37') wherein:

c) each of said switching valves (27, 28) is coordinated with a damper-switching and vent valve (29, 30);

d) each of said switching valves (27, 28) has in the respective valve housing (31, 31'), a movable valve piston (33, 33') and a damper piston (40, 40') and a spring (38, 38') wherein said damper piston can be loaded with a control pressure which is supplied by the respective damper, switching and vent valve (29, 30) connectable with the particular switching valve (27, 28);

e) said switching device (26) has a safety and vent device designed so that upon actuation of one of said switching components (1, 2) the other switching component is automatically disengaged; and wherein a control pressure which engages an active surface of said valve piston (33, 33') of the switching valve (28 or 27) belonging to the switching component (2 or 1) not selected, is supplied, via a control pressure line (44 or 45) in a manner such that respective tank connection (37, 37') is opened, said control pressure also discharges in the damper, switching and vent valve (29, 30) belonging to the selected switching component (1 or 2) in such a manner that said respective damper piston (40, 40') thereby loaded with pressure produces by continuous prestress of the respective spring (38, 38'), a pressure ramp needed for switching the corresponding switching component.

2. The device according to claim 1, wherein each of said switching valves (27, 28) has on one side of its valve piston (33, 33') the respective prestressable spring (38, 38') within a working space (39, 39') defined at one end of said spring (38, 38') by the valve piston (33, 33') and at an opposing end of said spring by the damper piston (40, 40'), the damper piston being axially moveable and supporting said spring (38, 38') in the valve housing (31, 31').

3. The device according to claim 2, wherein the prestress of said spring (38, 38') in each of said switching valves (27, 28) and the positioning of said valve piston (33, 33') connectable with said spring are adjustable in a manner such that the pressurized medium fed to each of said switching components (1, 2) and the control pressure from the respective control line (44, 45) act on the other side of said valve piston, and said one side of said valve piston facing said spring (38, 38') is loaded with a pressure composed of a pressure passed into the working space (39, 39') of said spring (38, 38') via a pressure line (48) from a load pressure valve (19) and another pressure is passed to the side of said damper piston remote from said spring via a pressure line from the damper, switching and vent valve coordinated with the respective switching valve.

4. The device according to claim 1, wherein each of said damper, switching and vent valves (29, 30) and coordinated switching valve (27, 28) can be loaded with pressurized medium directly at a specific pressure of the respective switching component (1, 2).

5. The device according to claim 1, wherein the supply of pressurized medium from one of the control pressure lines (44, 45) to the respective damper, switching and vent valve (29, 30) is throttled by a nozzle (46, 47).

6. The device according to claim 1, wherein said selector slide (15) has at least one other switching position for forward drive (L) and a parking position (P).

7. The device according to claim 1, wherein in neutral position (N) and parking position (P) of said selector slide (15), pressurized medium from said switching components (1, 2) can be removed via said selector slide (15) and pressure lines (49, 50) to a pressurized-medium tank (51, 52), there being located between said selector slide (15) and said pressurized-medium tank (51, 52) a draining nozzle (53, 54).

8. The device according to claim 7, wherein said draining nozzle (53, 54) is adjustable according to the temperature of the transmission in a manner such that the discharge time of said switching components (1, 2) is constant over a definite range of the temperature of the transmission.

9. The device according to claim 3, wherein the pressure supplied via said selector slide (15) to the selected switching component (1 or 2) is fed by a clutch pressure valve (16) whereby operating with a closed one of said switching component (1, 2) a pressure dependent on an engine torque is presettable.

10. The device according to claim 9, wherein the output pressure of said clutch pressure valve (16) and the output pressure of said load pressure valve (19) can be regulated by pressure regulators (17, 21) designed as electromagnetically adjustable proportional valves.

11. The device according to claim 1, wherein the shift from the neutral position (N) to one of the forward drive position (D, L), and the reverse drive position (R) can be electrically determined by an electronic control.

* * * * *